| United States Patent [19] | [11] Patent Number: 4,699,233 |
|---|---|
| Koga et al. | [45] Date of Patent: Oct. 13, 1987 |

[54] VEHICLE BODY FRAME OF MOTOR BICYCLE

[75] Inventors: Noritaka Koga, Sakado; Toshio Yamagiwa, Niiza, both of Japan

[73] Assignee: Honda Giken Kogyo Kabushiki Kaisha, Tokyo, Japan

[21] Appl. No.: 742,179

[22] Filed: Jun. 7, 1985

[30] Foreign Application Priority Data

Jun. 25, 1984 [JP] Japan ................. 59-129159

[51] Int. Cl.⁴ ................. B62K 11/02; B62K 3/02
[52] U.S. Cl. ................. 180/219; 280/274; 280/279; 280/281 R
[58] Field of Search ............ 280/281 R, 274, 276, 280/279, 280, 283; 180/219

[56] References Cited

U.S. PATENT DOCUMENTS

| 2,333,642 | 11/1943 | Dempsey | 280/281 R |
| 2,493,037 | 1/1950 | Simon | 280/281 R |
| 2,535,540 | 12/1950 | Lechmere | 280/281 R |
| 3,226,132 | 12/1965 | Otani | 280/281 R |
| 3,860,265 | 1/1975 | Weiss | 280/281 R |
| 4,111,447 | 9/1978 | Ishida | 280/281 R |
| 4,427,209 | 1/1984 | Morita | 280/283 |
| 4,541,649 | 9/1985 | Grunfeld | 280/281 R |
| 4,561,670 | 12/1985 | Takada | 280/281 R |

FOREIGN PATENT DOCUMENTS

| 585459 | 5/1925 | France | 280/281 R |
| 404818 | 7/1943 | Italy | 280/281 R |
| 123128 | 10/1948 | Sweden | 280/281 R |
| 102889 | 1/1924 | Switzerland | 280/281 R |
| 640066 | 7/1950 | United Kingdom | 280/281 R |

*Primary Examiner*—David M. Mitchell
*Assistant Examiner*—Everett G. Diederiks, Jr.
*Attorney, Agent, or Firm*—Armstrong, Nikaido, Marmelstein & Kubovcik

[57] ABSTRACT

A pair of right and left main pipes and or a pair of right and left down tubes, or a main pipe and a down tube are formed of one piece of continuous pipe material with its intermediate portion warped. The head pipe has a supporting surface portion corresponding to the surface of the aforementioned warped intermediate portion. This supporting surface portion is integrally cast together with a tubular main body portion of the headpipe. The warped intermediate portion of the pipe material is fixed to the supporting surface portion of the head pipe by welding. According to the present invention, the constructions and shapes of the welded portions are simplified. Thus, the invention is best suited to robot welding in order to improve productivity. Also, the head pipe is formed at its front surface or its both sides of its tubular main body portion with an opening in order to reduce the weight.

3 Claims, 15 Drawing Figures

VEHICLE BODY FRAME OF MOTOR BICYCLE

BACKGROUND OF THE INVENTION

This invention relates to a vehicle body frame of a motor bicycle, and more particularly to a construction of the connecting portion between a head pipe and a frame member.

The vehicle body frame of a motor bicycle has such a role as to support an engine and a power transmission as well as a rider, a load, various equipments, etc., and is the most important vehicle structure for connecting the front and rear wheels. The front portion of the body frame is especially important, since it serves to support an engine and a fuel tank and is connected to a steering head.

The vehicle body frame of a motor bicycle as briefly mentioned above includes a head pipe pivotably supporting a front fork at its front end portion, so that the front fork may be operated freely and a main pipe connected to the head pipe and extending backward of the vehicle body therefrom. And, in a cradle type frame, it further includes a down tube extending downward at an angle. The main pipe and down tube are usually formed of a pipe member such as a steel pipe, etc. The end portions of these pipe members are, either directly or through a gusset, firmly attached to the surface of the head pipe by welding. However, in the conventional construction of the head pipe portion as mentioned above, since two tubular members are required to be welded together, the accuracy of the mating surfaces of the respective members becomes a problem. In order to perform a satisfactory welding, a special attention is especially required.

When the welding is made through the gusset, etc., the number of the component parts becomes large. This means that the number of places where welding is required also increases. In any event, a problem exists in view of productivity.

Particularly, in recent years, there is a tendency that various welding works are automatically made. There are more and more cases where an industiral robot is employed for welding. However, with the above mentioned construction of the welding portions (or places) of the conventional vehicle body frame, even if a welding robot is employed for welding, an easy weld cannot be performed.

SUMMARY OF THE INVENTION

The present invention aims at improving a conventional vehicle body frame, inter alia, the construction of the connecting portion between the head pipe and the frame member.

It is therefore a principal object of the present invention to provide a vehicle body frame wherein the welding between the head pipe and the frame member can be performed easily.

One specific object of the present invention is to provide a vehicle body frame wherein an industrial robot can be effectively employed for welding between the head pipe and the frame member.

Another specific object of the present invention is to provide a vehicle body frame wherein the frame members can be directly welded to the head pipe without a help of a gusset, etc, so that the number of component parts can be reduced.

A further specific object of the present invention is to provide a vehicle body frame wherein the head pipe is integrally cast with a supporting member adapted to support the frame member, so that the number of the component parts can be reduced.

A still further specific object of the present invention is to provide a vehicle body frame which is light in weight and sufficient in strength.

In order to achieve the above objects, a vehicle body frame of a motor bicycle according to the present invention comprises at least a pair of frame members formed of one continuous pipe material warped or bent at its intermediate portion and a head pipe formed of an integrally cast product including a supporting portion having a surface configuration corresponding to the external surface of the aforementioned warped or bent central portion, the central convex surface of said warped intermediate portion being abutted against the concave surface of said supporting portion and welded together.

According to the present invention, the pair of frame members are integrated through the intermediate warped portion. In order to mount these frame members to the head pipe, the aforementioned warped portion is simply required to be abutted against the supporting surface portion of the head pipe. Since only one process is required for the mounting, the mounting efficiency can be improved.

Also, since the frame members mounted in such a manner as described may be directly welded to the supporting portion of the head pipe, fewer weeds are required and the welding line can be simplified. Thus, the productivity can be improved and it is best suited to a robot welding.

Further, since the head pipe is integrally cast with the supporting portion, there are fewer component parts are less, and the costs of the molds, it can meet with such requirements as to produce various kinds of vehicle body frames in a small quantity. Since the frame is of an integral construction, the number of the welding jigs can be reduced, and therefore, the costs of the jigs can be reduced.

DETAILED DESCRIPTION OF THE EMBODIMENTS

Preferred embodiments of the present invention will be described hereunder with reference to the accompanying drawings in which like numerals denote like or corresponding parts throughout the several sheets, so that duplicate description can be avoided.

Figure 1:
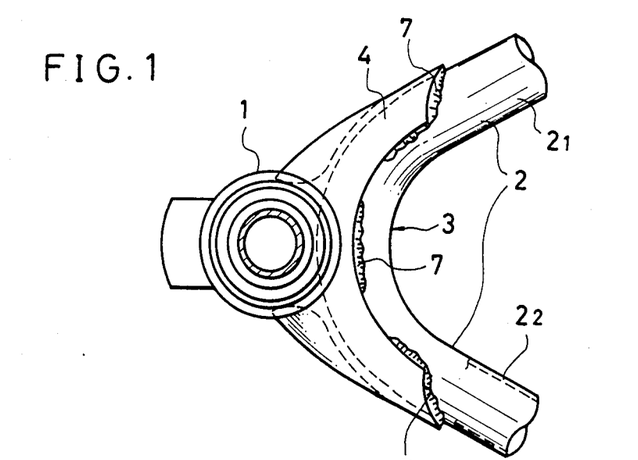
FIG. 1 is a top view of a head pipe and its vicinity according to a first embodiment of the present invention.
Figure 2:
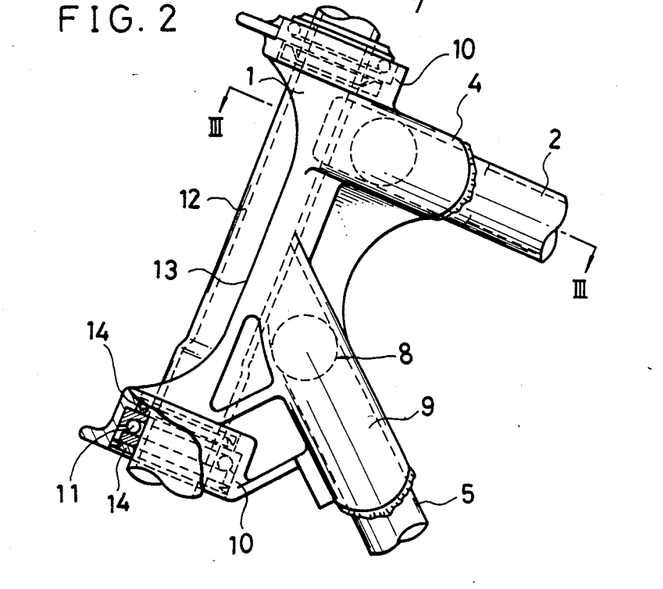
FIG. 2 is a side view of the above.
Figures 3, 4:
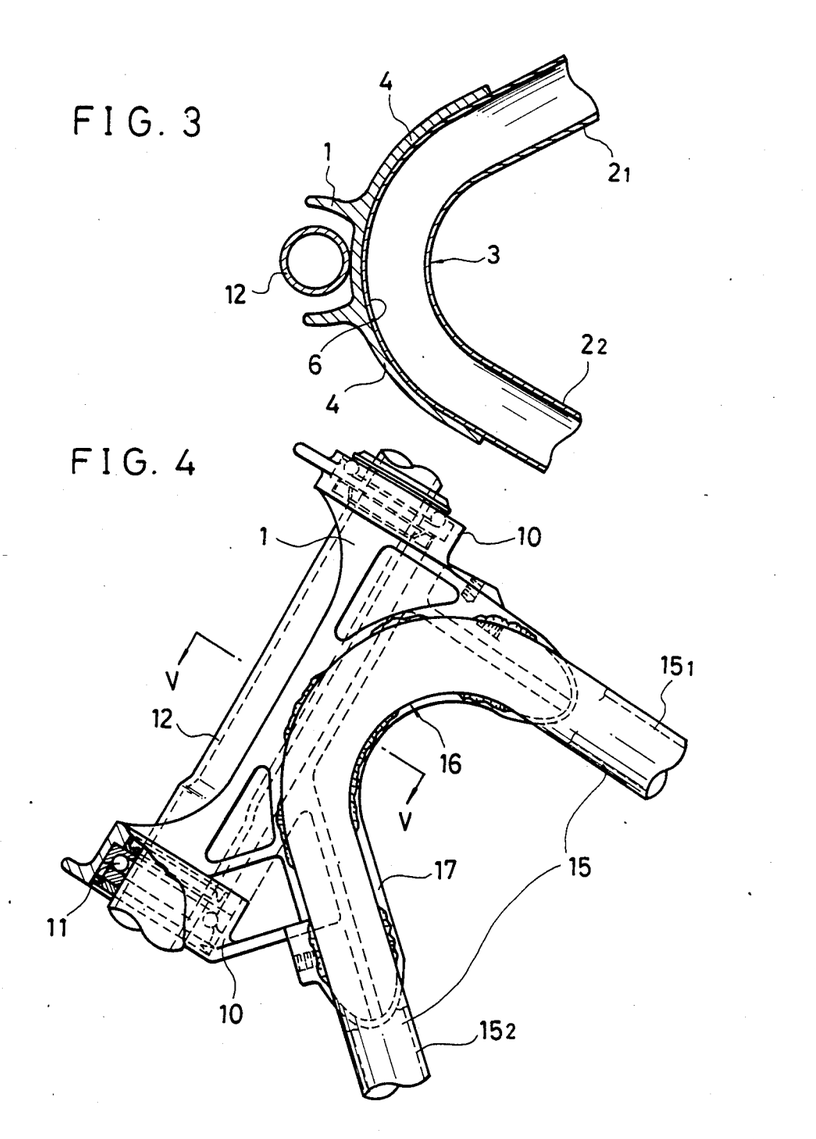
FIG. 3 is a sectional view taken along line III—III of FIG. 2.
FIG. 4 is a side view of a head pipe and its vicinity according to a second embodiment of the present invention.

FIGS. 1 through 3 illustrate a first embodiment of the present invention. In this embodiment, a head pipe 1 is fixed at its upper portion with a main pipe 2 as a frame member, and at its lower portion with a down tube 5 as another frame member.

The main pipe 2 is, as shown in FIGS. 1 and 3, formed of a pipe material warped at its intermediate portion 3 to form a pair of right and left main pipes $2_1$ and $2_2$. The head pipe 1 is provided with a supporting portion 4 including a concave supporting surface 6 corresponding to the external convex surface form of the aforementioned warped portion 3, with the supporting surface 6 facing backward. The main pipe 2 is held by the supporting portion 4 with its external surface of the warped portion 3 abutted against the corresponding supporting surface 6, and is, as designated at 7, welded along the peripheral portion of the supporting portion 4.

The down tube 5 is formed of a pair of right and left down tubes integrated together through an intermediate warped portion 8, as in the case with the aforementioned main pipe 2. The down tube 5 is held at its warped portion 8 by a down tube supporting portion 9 similar to the supporting portion 4 for the main tube 2, and welded along the peripheral portion of the supporting surface portion 9.

The head pipe 1 is made of a cast iron or a cast steel material which can be welded or formed, and integrally welded with the aforementioned supporting surface portions 4 and 9. This head pipe 1 is integrally cast at its both upper and lower end portions with a boss shaped bearing box portion 10. The head pipe 1 is pivotally attached to a handle rotation shaft 12 through a ball bearing 11 fitted in the bearing box portion 10. The head pipe 1 is formed at its front surface portion with an opening 13 cut out in order to reduce its weight. The ball bearing 11 is provided with a dust seal 14.

Figure 5:
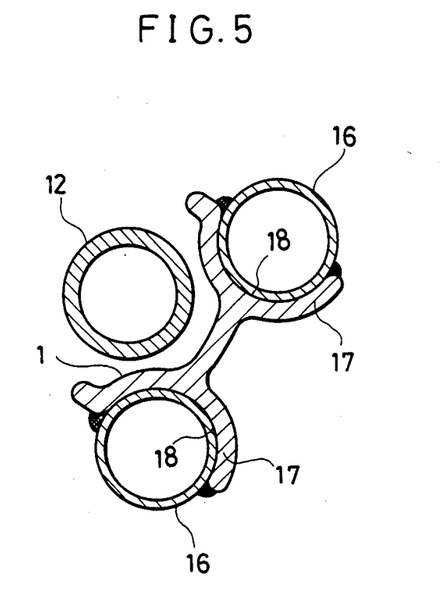
FIG. 5 is a sectional view taken along line V—V of FIG. 4.

FIGS. 4 and 5 illustrate a second embodiment of the present invention. In this embodiment, a main pipe $15_1$ and a down tube $15_2$ are connected with each other through the warped portion 16 to form an integral frame member 15. A pair of such frame members 15 for the right and left sides are attached to the head pipe 1, respectively.

The head pipe 1 is provided at both sides of its rear portion with a supporting surface portion 17, respectively. This supporting surface portion 17 includes, as in the case with the supporting surface portions 4 and 9 of the preceding embodiment, a supporting surface 18 corresponding to the external form of the aforementioned warped portion 16 of the frame member 15. The supporting surface 18 is opened sideward. The frame member 15 is held by the supporting surface portion 17, with its warped portion 16 abutted against the aforementioned supporting surface 18 and welded at suitable portions along the peripheral portion of the supporting portion 17 for fixture.

The constructions of the other portions of the head pipe 1 are identical with those of the first embodiment illustrated in FIGS. 1 through 3. The corresponding parts are designated at like numerals in FIGS. 4 and 5.

In the above mentioned respective embodiments, the frame members 2, 5 and 15 are attached to the head pipe 1 in the following manner. First of all, the warped portions 3, 8 and 16 of the respective frame members are abutted against the corresponding supporting portions 4, 9 and 17. Then, the frame members 2, 5 and 15 are simply welded at suitable portions thereof along the peripheral portions of the supporting portions. In this way, the mounting operation can be made extremely easy and the welding operation can be also simplified. Thus, it is possible to employ a conventional automatic welding method in order to increase the productivity.

Figure 6:
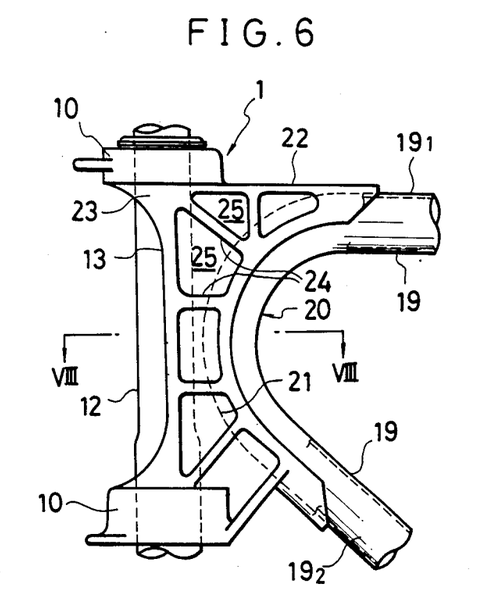
FIG. 6 is a side view of a head pipe and its vicinity according to a third embodiment of the present invention.
Figure 7:
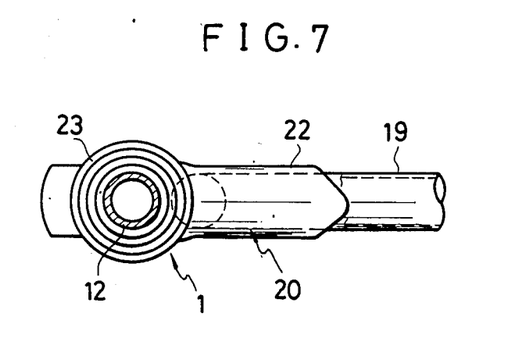
FIG. 7 is a top view of the above.
Figure 8:
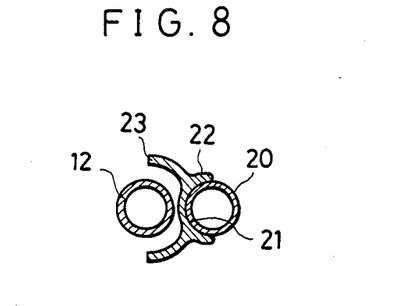
FIG. 8 is a sectional view taken along line VIII—VIII of FIG. 6.

FIGS. 6 through 8 illustrate a third embodiment of the present invention. In this embodiment, the head pipe 1 is provided at the central portion of its rear surface with a frame member 19 extending in the vertical direction. This frame member 19 is formed of one piece of pipe member warped at its intermediate portion to form a pair of upper and lower frame portions $19_1$ and $19_2$. One of the frame portions $19_1$ is adapted to form the main pipe, while the other frame portion $19_2$ forms the down tube.

The head pipe 1 is provided with a supporting portion 22 including a supporting surface 21 corresponding to the external form of the aforementioned warped portion 20 of the frame member 19, with the supporting surface 21 facing backward. The frame member 19 is held by the supporting portion 22 with the external surface of the warped portion 20 abutted against the supporting surface 21, and suitably welded along the periphery portion of the supporting portion 22.

The head pipe 1 is a cast product formed of a tubular main body portion 23 and the aforementioned supporting portion 22 integrated together.

The front surface portion of a cylindrical wall of the main body portion 23 is, as in the cases with the preceding respective embodiments, largely cut out to form an opening portion 13 extending between the upper and lower bearing box portions 10 and 10. This opening portion 13 is formed in order to reduce the weight of the head pipe 1 extensively. The supporting portion 22 is formed at its external side surface to have a number of depressed portions 25 adapted to minimize its thickness excepting reinforcing rib portions 24. These depressed portions also serve to reduce its weight even further. These depressed portions 25 and the aforementioned opening 13 are to be formed at the same time when the head pipe 1 is cast. Accordingly, no special cutting or working is required at all. The opening 13 may be covered with a resin plate, etc., after the vehicle body frame is assembled.

Figure 9:
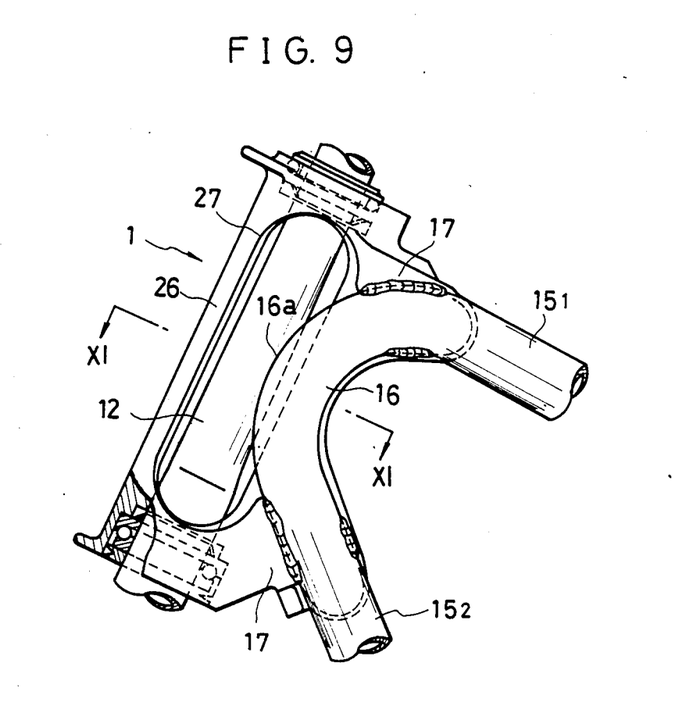
FIG. 9 is a side view of a head pipe and its vicinity according to a fourth embodiment of the present invention.
Figure 10:
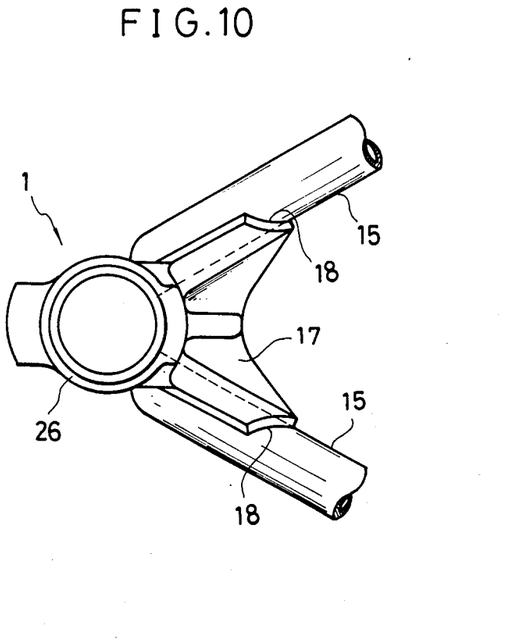
FIG. 10 is a top view of the above.
Figure 11:
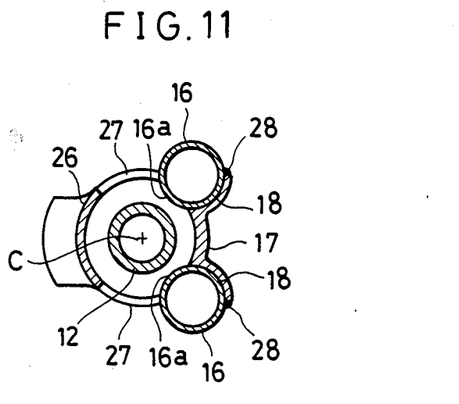
FIG. 11 is a sectional view taken along line XI—XI of FIG. 9.

FIGS. 9 through 11 illustrate a fourth embodiment of the present invention. In this embodiment, the head pipe 1 is, as in the case with the above second embodiment, welded for fixture at the both sides of its rear portion with the frame member 15 formed of the main pipe $15_1$ and the down tube $15_2$ integrally connected together through the warped portion of a letter "U" shape. However, this embodiment is different from the preceding respective embodiments in a point where a main body portion 26 of a tubular shape of the head pipe 1 is provided at its both right and left sides with an opening 27 cut out.

As in the case with the above mentioned second embodiment, the supporting portion 17 is provided at its both right and left sides extending backward and sideward with the supporting surface 18 corresponding to the external form of the aforementioned warped portion 16 of the frame member 15, respectively. The supporting surface 18 is opened sideward. And, the frame member 15 is intimately attached at its warped portion 16 to the supporting surface 18 and welded at suitable places along the peripheral portion of the supporting surface 18 for fixture. The front end portion 16a of the warped portion 16 passing through the opening portion 27 is entered into the main body portion 26. Accordingly, the position of the welding portion 28 between the warped portion 16 and the supporting surface 18 is made closer to the central axis c of the main body portion 26 to the extent that the front end portion 16a of the warped portion 16 is entered in the main body portion 26. Since the moment acting on the welding portion will become smaller, the strength will be increased.

Figure 12:
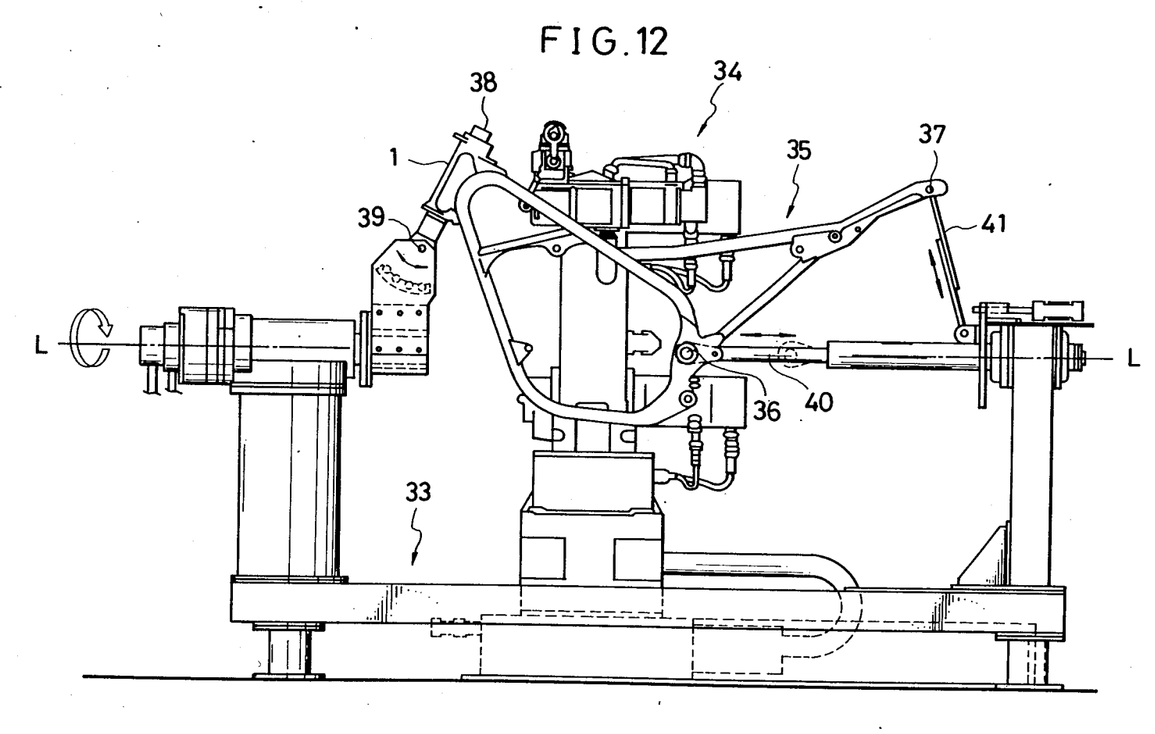
FIG. 12 is a front view of a welding apparatus.
Figure 13:
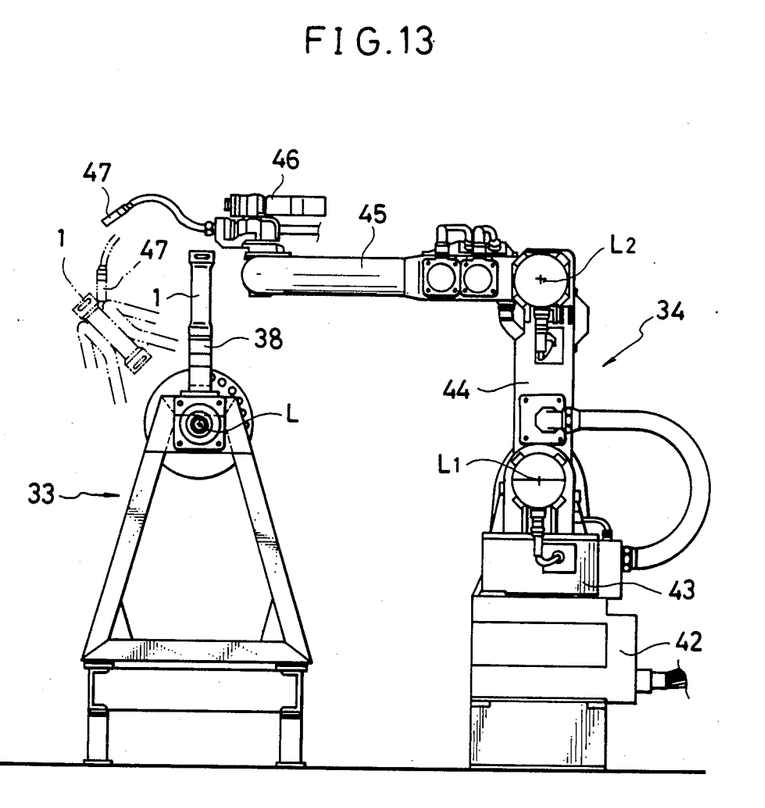
FIG. 13 is a side view of the above.

FIGS. 12 and 13 illustrate on example of a welding apparatus to be used for the above mentioned vehicle body frame. This welding apparatus comprises a fixing jig 33 adapted to fix the vehicle body frame, and a welding robot 34 provided at both sides of this fixing jig 33 respectively, or at one side only. A tack welded vehicle body frame 35 is, as shown in FIG. 12, attached to the fixing jig 33 at three places of the head pipe 1, a rear fork pivot shaft 36 and a rear end portion 37. However, a head pipe mounting member 38 of the fixing jig 33 is rotatable about a horizontal shaft 39, and a pivot mounting member 40 is slidable in the fore and aft direction. A rear portion mounting member 41 is made adjustable, as shown by an arrow in FIG. 12. The vehicle body frame 35 is to be mounted to the fixing jig 33 in the following manner. Firstly, the head pipe 1 is fitted on the head pipe mounting member 38, and the head pipe mounting member 38 is rotated about the horizontal shaft 39 in order to bring the rear fork pivot shaft 36 to be in the same height as that of the pivot shaft mounting member 40. Simultaneously, the pivot mounting member 40 is slide fore and aft in order to bring the rear fork pivot shaft 36 to be in agreement with the pivot shaft mounting member 40 for connecting together. Then, the rear portion mounting member 41 is adjusted so that the rear end portion 37 is supported by the member 41. Accordingly, the mounting jig 33 is well fitted to various kinds of vehicle body frames 35 having different sizes and constructions. The head pipe mounting member 38, pivot shaft mounting member 40 and rear portion mounting member 41 are designed so as to be integrally rotated about an axis L extending in the fore and aft direction. In response to this motion, the vehicle body frame 35 as a whole is rotated about the axis L.

The welding robot 34 includes, as shown in FIG. 13, a reciprocating table 42 adapted to reciprocate fore and aft along the fixing jig 33, a turn table 43 rotating about a perpendicular axis on the reciprocating table 42, a leg 44 tilting about a horizontal shaft $L_1$ on the turn table 43, an arm 45 oscillating about a horizontal shaft $L_2$, a welding head 46 rotating about three axes crossing at right angles at the foremost end portion of the arm 45, and a welding nozzle 47 mounted to this welding head 46. Accordingly, the welding nozzle 47 can move freely. When the head pipe 1 of the vehicle body frame is welded to the frame members according to the above mentioned respective embodiments by using this welding apparatus, the vehicle body frame is rotated about the aforementioned axis L to bring the head pipe 1 as well as the frame members to be in such postures as shown, for example, by the chain lines in FIG. 13, and the welding nozzle 47 is moved close thereto from above. In this way, a satisfactory welding can be effected by means of downward welding. Since the welding line between the head pipe 1 and frame members has an extremely simple form as mentioned above, the welding robot 34 can be controlled easily. Thus, the work 10 efficiency is improved extensively.

Figure 14:
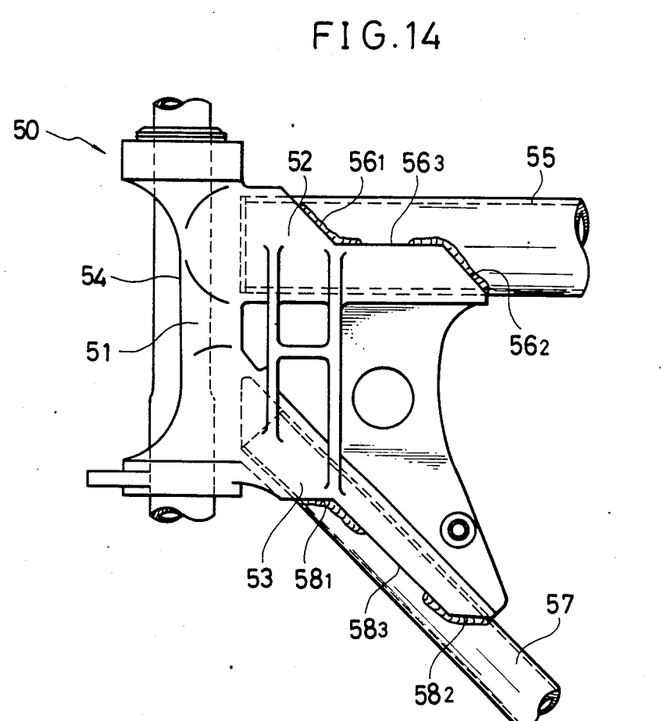
FIG. 14 is a side view of a head pipe of another vehicle body frame and its vicinity to which the above welding apparatus is suitably applicable.
Figure 15:
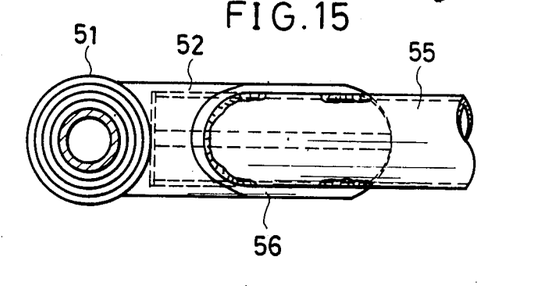
FIG. 15 is a top view of the above.

When the above welding apparatus is used, a vehicle frame as shown in FIGS. 14 and 15 can be easily welded. This vehicle body frame includes, as in the case with the above respective embodiments, a head pipe 50 formed of a tubular main body portion 51 and supporting portions 52 and 53 integrally cast together. The main body portion is formed at its front surface with an opening portion 54. The supporting portions 52 and 53 are formed in a tubular shape. An end portion of a main pipe 55 is inserted in one of the supporting portions 52. An end face of the supporting portion 52 includes portions $56_1$ and $56_2$ inclined with respect to the axis of the main pipe 55 and a portion $56_3$ connecting the portions $56_1$ and $56_2$ and parallel with respect to the aforementioned axis. The supporting portion 52 and the main pipe 55 are welded together along this end face 56. A down tube 57 is inserted in and welded to the other supporting portion 53 in the same manner as described. Similarly, the end face of the supporting portion 53 includes inclining portions $58_1$ and $58_2$ and a parallel portion $58_3$.

What is claimed is:

1. A vehicle body frame of a motor bicycle comprising:
    at least a pair of frame members formed of one piece of continuous pipe material with its intermediate portion warped to form an external longitudinally and laterally convex surface;
    a head pipe formed of an integrally cast product including a supporting longitudinally and laterally concave surface portion with a semi-circular cross-section corresponding along its surface to the warped external longitudinally and laterally convex surface of said intermediate portion; and
    said warped intermediate portion external longitudinally and laterally convex surface of said frame members being abutted against said head pipe at said corresponding supporting longitudinally and laterally concave surface portion and affixed thereto, wherein a first pair of frame members are formed as a pair of right and left main pipes, a second pair of frame members are formed as a pair of right and left down tubes, a first concave surface portion corresponding to said first pair of frame members is arranged along a plane perpendicular to said head pipe, and a second concave surface portion corresponding to said second pair of frame members is arranged along a plane inclined at an angle to said head pipe.

2. A vehicle body frame as claimed in claim 1, wherein said head pipe is formed at its tubular main body portion with an opening.

3. A vehicle body frame as claimed in claim 1, wherein said supporting surface portion and said warped intermediate portion are welded together by an automatic welding apparatus.

* * * * *